Patented Aug. 12, 1947

2,425,415

UNITED STATES PATENT OFFICE 2,425,415

ACIDIZING EARTH BORES

Donald C. Bond, Northbrook, and George W. Ayers, Chicago, Ill., assignors to The Pure Oil Company, Chicago, Ill., a corporation of Ohio No Drawing. Application December 5, 1945, Serial No. 633,048

7 Claims. (Cl. 252—8.55)

This invention relates to the acidizing of earth bores for the purpose of rendering the formation surrounding such earth bores more porous and permeable to the flow of fluids therethrough.

In Patent No. 2,300,393 there is disclosed a method for increasing the fluid permeability of siliceous earth formations by introducing into such formations through an earth bore fluoboric acid which may or may not contain free hydrofluoric acid. Fluoboric acid which contains no excess of free hydrofluoric acid, although it does render siliceous formations more permeable to fluids, does not have sufficient reactivity with the earth formation to increase the permeability to the extent desired, whereas fluoboric acid containing free hydrofluoric acid, although its activity is of the desired magnitude is objectionable for the reason that it causes precipitation of calcium and magnesium salts which are generally found in all siliceous formations.

This invention is an improvement over the process disclosed in the aforesaid patent in that the siliceous formation is pretreated with fluoboric acid which contains no free hydrofluoric acid, but which contains an excess of boric acid, in order to render soluble the calcium and magnesium compounds present in the formation and remove them prior to treatment of the formation with fluoboric acid containing free hydrofluoric acid.

In accordance with our invention an aqueous fluoboric acid solution containing approximately from 10% to 50% by weight of fluoboric acid and preferably about 10% to 20% of fluoboric acid and containing excess boric acid in the amount of approximately 0.1% to 5.0% by weight, but preferably 0.5% to 2%, is injected into the earth bore which is to be rendered permeable. The amount of acid used in the pretreatment may vary depending principally on the nature of the formation treated and the concentration of the acid. Ordinarily, from 500 to 3000 gallons of acid solution is sufficient. In the treatment of oil wells or water injection wells in oil producing fields we have found that an initial treatment with approximately 1,000 gallons of 10% aqueous fluoboric acid containing 0.8% excess boric acid gives good results.

After the initial acid has had time to penetrate the formation surrounding the earth bore the bore may or may not be flushed with water to wash out dissolved salts and then treated with aqueous fluoboric acid solution containing excess free hydrofluoric acid. In the second step an aqueous solution containing 10% to 50% by weight of fluoboric acid, but preferably between 10% and 20%, and approximately 0.1% to 3% by weight of free hydrofluoric acid, but preferably between 0.25% and 1% is used. In the second step the amount of acid solution used may vary within wide limits, but we have found that a treatment with acid of the aforesaid concentration of approximately 500 to 5,000 gallons gives good results.

In preparing the fluoboric acid solution containing free hydrofluoric acid the solution may be made by adding an acid salt, such as ammonium or potassium acid fluoride, to the fluoboric acid solution.

The acid solutions may contain any well inhibitor such as arsenious oxide or formaldehyde to inhibit corrosion of the well pipe and casing. Upon injection of the fluoboric acid containing free hydrofluoric acid into the earth bore the pressure required to force the acid into the formation rapidly decreases, and the amount of solution which can be forced into the formation rapidly increases until a point is reached at which the pressure remains substantially constant for a given input. When this point is reached sufficient acid has been injected.

In order to demonstrate the invention a water injection well in a "seven-spot" system in the Berea sand of the Cabin Creek, West Virginia field was first treated by injecting therein 500 gallons of 8% aqueous hydrochloric acid followed by 500 gallons of "mud acid" (15% hydrochloric acid plus 3% ammonium acid fluoride). After this treatment the rate at which water could be injected into the well was the same as before the treatment for the same surface pressure. This well required a surface pressure of 1,000 pounds per square inch in order to force 10 barrels of water into the well per hour, and required 1350 pounds per square inch surface pressure to force 75 barrels of water per hour into the well both before and after the treatment. The well was then treated with 1,000 gallons of 10% aqueous fluoboric acid containing 0.8% of boric acid. After this treatment the well received 10 barrels of water per hour at 925 pounds per square inch surface pressure, as compared with 2.5 barrels per hour before the treatment with the aqueous fluoboric acid containing excess boric acid, under the same pressure. The threshhold pressure required to pump any appreciable amount of water into the well, namely 850 pounds per square inch, remained substantially unchanged.

Thereafter, 3,000 gallons of 10% aqueous fluoboric acid containing 0.25% by weight of excess hydrofluoric acid was injected into the well. The pressure dropped gradually as the acid was injected falling to about 500 pounds per square inch when half the acid had been injected at a rate of injection of 24 barrels per hour. The last part of the acid was injected into the well at a rate of 90 barrels per hour at a pressure of only 65 pounds per square inch. After the acid had all been injected and the well had been permitted to stand for a period of about 24 hours the well was flushed with a large amount of water, causing considerable back pressure to be built up in the sand. In spite of this fact it was possible to inject the water at the rate of 150 barrels per hour at a surface pressure of only 890 pounds per square inch and to inject 67 barrels per hour at a pressure of 650 pounds per square inch. At the latter pressure no measurable amount of water could be injected into the well before the treatment.

Although the test was made on a water injection well in a sand formation, it is to be understood that the invention is equally applicable to the treatment of oil producing wells in order to render the producing formation more porous and to increase the flow of oil to the well.

By subjecting sand formations containing calcium and/or magnesium salts to a two-stage treatment, in the first stage of which fluoboric acid containing an excess of boric acid is used, and in the second stage of which fluoboric acid containing an excess of hydrofluoric acid is used, the calcium and/or magnesium compounds are dissolved and removed without forming undesirable gelatinous siliceous precipitates and the siliceous material is then readily attacked and made more porous without causing formation of insoluble precipitates which would otherwise obstruct the pores in the producing formation.

The invention may be practiced by preparing acid solution of the desired composition and injecting into the formation to be treated or by simultaneously and separately injecting into the earth bore reagents such as fluoboric acid and boric acid which will react to form the acid solution in situ. In practicing the invention in the manner last mentioned care should be exercised to inject the proper amount of each reagent to obtain the desired solution and at such rate that at no time is there a considerable excess of free hydrofluoric acid present in the well.

It is claimed:

1. The method of treating a siliceous earth formation containing substances of the class consisting of calcium and magnesium compounds in order to render said formation more permeable to fluids comprising, injecting in said formation aqueous fluoboric acid solution containing a small amount of free boric acid, said free boric acid being present in amount sufficient to induce solution of calcium and magnesium compounds, and subsequently injecting into said formation aqueous fluoboric acid solution containing a small excess of free hydrofluoric acid, said free hydrofluoric acid being present in amount sufficient to enhance the action of the fluoboric acid on siliceous materials in the earth formation.

2. Method in accordance with claim 1 in which the acid solution used in the first mentioned treatment contains approximately 10 to 50 per cent by weight of fluoboric acid and approximately 0.1 to 5 per cent by weight of boric acid.

3. Method in accordance with claim 1 in which the acid solution used in the first mentioned treatment contains approximately 10 per cent by weight of fluoboric acid and approximately 0.8 per cent by weight of boric acid.

4. Method in accordance with claim 1 in which the acid solution used in the second mentioned treatment contains approximately 10 to 50 per cent by weight of fluoboric acid and approximately 0.1 to 3 per cent of hydrofluoric acid.

5. Method in accordance with claim 1 in which the said solution used in the second mentioned treatment contains approximately 10 per cent by weight of fluoboric acid and approximately 0.25 per cent by weight of hydrofluoric acid.

6. The method of increasing the fluid permeability of a siliceous earth formation containing substances of the class consisting of calcium and magnesium compounds comprising injecting into a bore in said formation approximately 500 to 3000 gallons of aqueous solution containing from about 10 to 50 per cent by weight of fluoboric acid and about 0.1 to 5 per cent by weight of boric acid and thereafter injecting into said bore approximately 500–5000 gallons of aqueous solution containing about 10 to 50 per cent by weight of fluoboric acid and approximately 0.1 to 3 per cent of hydrofluoric acid.

7. Method in accordance with claim 6 in which approximately 1000 gallons of 10 per cent fluoboric acid containing about 0.8 per cent by weight of boric acid is used in the first step and approximately 3000 gallons of 10% fluoboric acid containing about 0.25 per cent by weight of hydrofluoric acid is used in the second step.

DONALD C. BOND.
GEORGE W. AYERS.

REFERENCES CITED

The following references are of record in the file of this patent:

UNITED STATES PATENTS

| Number | Name | Date |
|---|---|---|
| 2,011,579 | Heath et al. | Aug. 20, 1935 |
| 2,225,695 | Henderson et al. | Dec. 24, 1940 |
| 2,300,393 | Ayers | Nov. 3, 1942 |
| 2,367,350 | Heigl | Jan. 16, 1945 |

OTHER REFERENCES

Briggs, Capacity Well Production, article in the Oil Weekly, May 17, 1943, pages 15–18.